May 19, 1936. M. S. O'BRIENT 2,041,479
AUTOMOBILE ENGINE CRANKING MECHANISM
Filed July 23, 1935 3 Sheets-Sheet 1
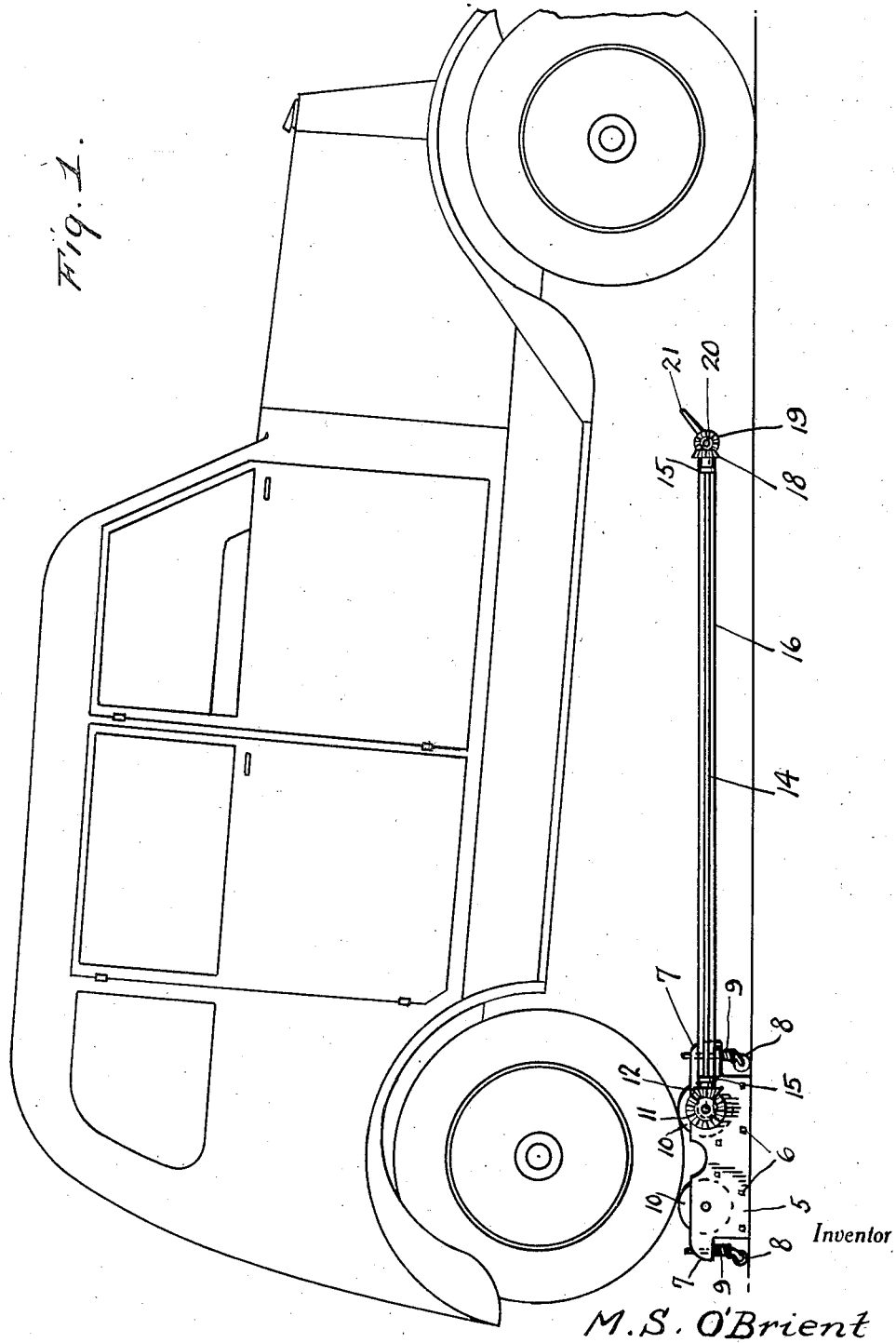
Inventor
M.S. O'Brient
By Clarence A O'Brien
Attorney

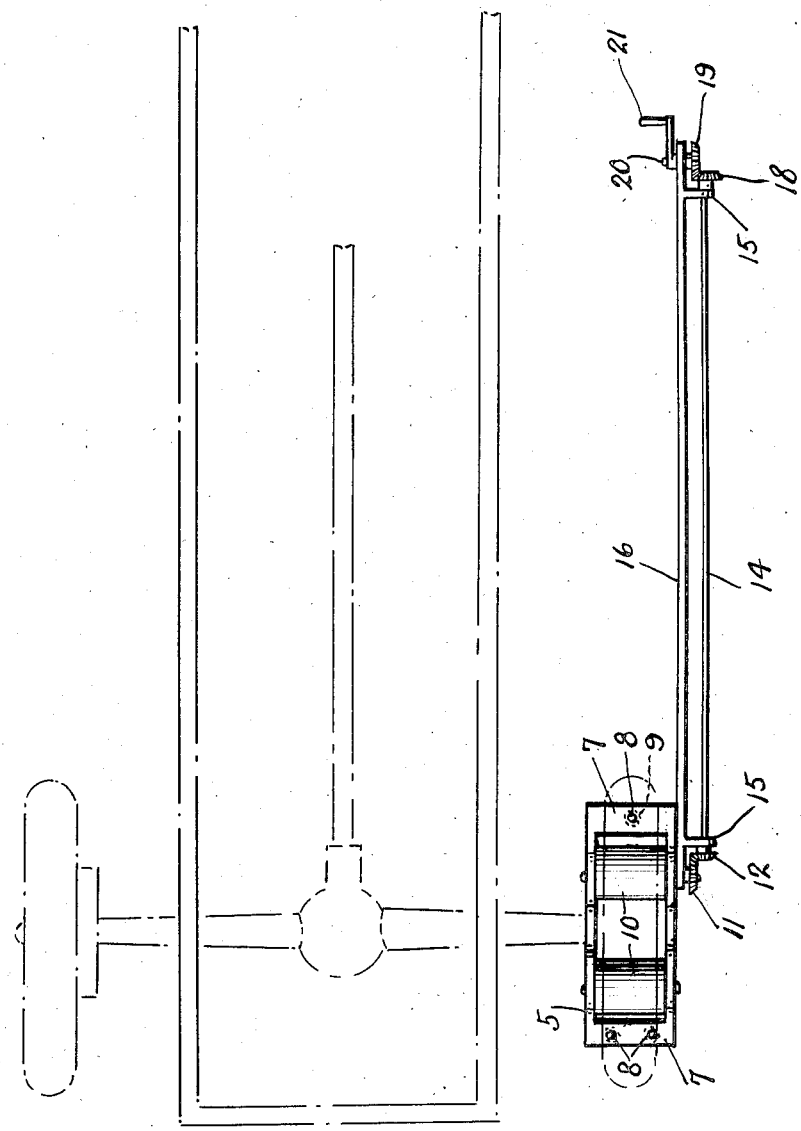

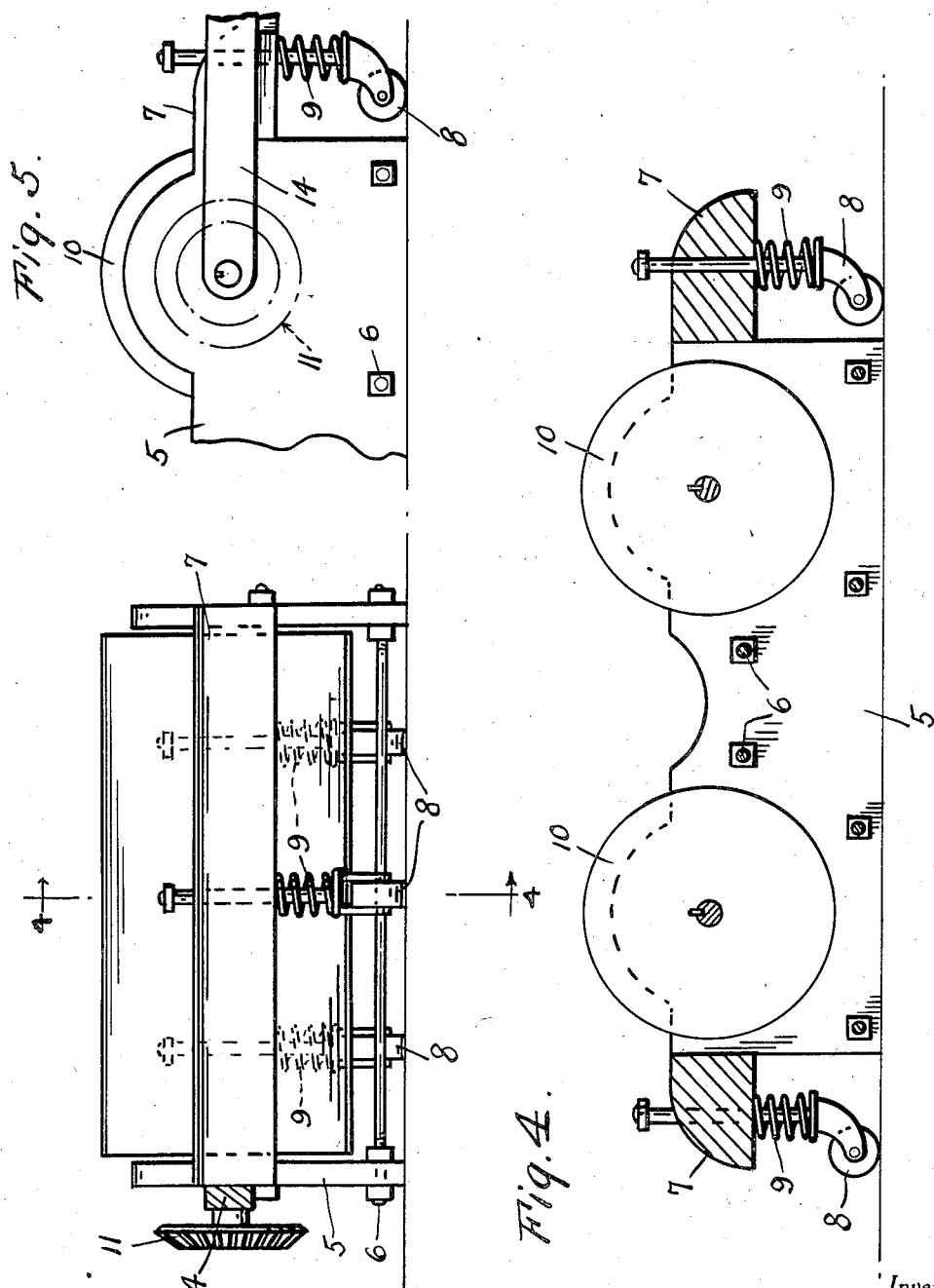

Patented May 19, 1936

2,041,479

UNITED STATES PATENT OFFICE 2,041,479

AUTOMOBILE ENGINE CRANKING MECHANISM

Maud Speed O'Brient, Durham, N. C.

Application July 23, 1935, Serial No. 32,814

1 Claim. (Cl. 74—14)

The present invention relates to a mechanism for cranking an automobile engine under certain conditions, and the object of the invention resides in the provision of a mechanism which is extremely simple in construction, easy to manipulate thoroughly efficient and reliable in use, easy to move from place to place, and otherwise well adapted to the purpose for which it is designed.

With the above and numerous other objects in view, as will appear as the description proceeds, the invention consists in certain novel features of construction and in the combination and arrangement of parts, as will be hereinafter more fully described and claimed.

Figure 1 is a side elevation of the apparatus embodying the features of my invention showing the same associated with one of the rear wheels of an automobile, Figure 2 is a top plan view of the apparatus showing the automobile in dotted lines, Figure 3 is a rear elevation of the apparatus showing a portion of the frame in section, Figure 4 is a vertical longitudinal section taken substantially on the line 4—4 of Figure 3, and Figure 5 is a fragmentary side elevation showing the rear portion of the apparatus.

Referring to the drawings, it will be seen that numeral 5—5 denotes a pair of side plates mounted and spaced for extensive parallelism by rods 6 and having at their front and rear ends cross members 7 in which are mounted casters 8 having cooperable therewith springs 9 which normally hold the side members of the frame in raised position. Across the side members are journaled a pair of drums 10 the axes of which are disposed and spaced parallel for extensive relationship for the purpose of receiving thereon one wheel of a vehicle such as an automobile as shown in Figure 1. The shaft of one of the drums or rollers 10 on the end thereof has a bevelled gear 11 which meshes with a bevelled pinion 12 on a shaft 14. The shaft 14 is journaled through a pair of lugs or ears 15 projecting from an elongated arm 16, one end of which is rockable on the shaft of the roller 10 on which the bevelled gear 11 is provided. The shaft 14 has mounted thereon a bevelled pinion 18 meshing with a bevelled pinion 19 journaled through the outer extremity of the arm 16 by means of a shaft 20 on which is mounted a crank 21.

The automobile has one wheel located on the drums 10 as shown in Figure 1. It will be seen that by operation of the crank 21, the engine of the automobile may be cranked in the manner usually desired. Of course, this apparatus is an emergency apparatus and I have devised a structure whereby the apparatus may be mobiled from place to place in an easy and convenient manner.

It is thought that the construction, operation, manipulation and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus of the character described comprising a frame structure, a pair of rotatable members mounted in the frame structure, a shaft for supporting one of the rotatable members, said frame being provided with an elongated arm projecting therefrom to a remote point, laterally extending lugs on the arm, a shaft extending longitudinally of the arm and journalled through the said lugs, a crank on one end of the arm, gear means between the crank and one end of the shaft and gear means between the opposite end of the shaft and the shaft of one of the rotatable members, said arm at one end being rockable on the last mentioned shaft.

MAUD SPEED O'BRIENT.